July 28, 1959 R. K. KAYE ET AL 2,897,298
TEST CONNECTOR CIRCUIT
Filed June 5, 1957
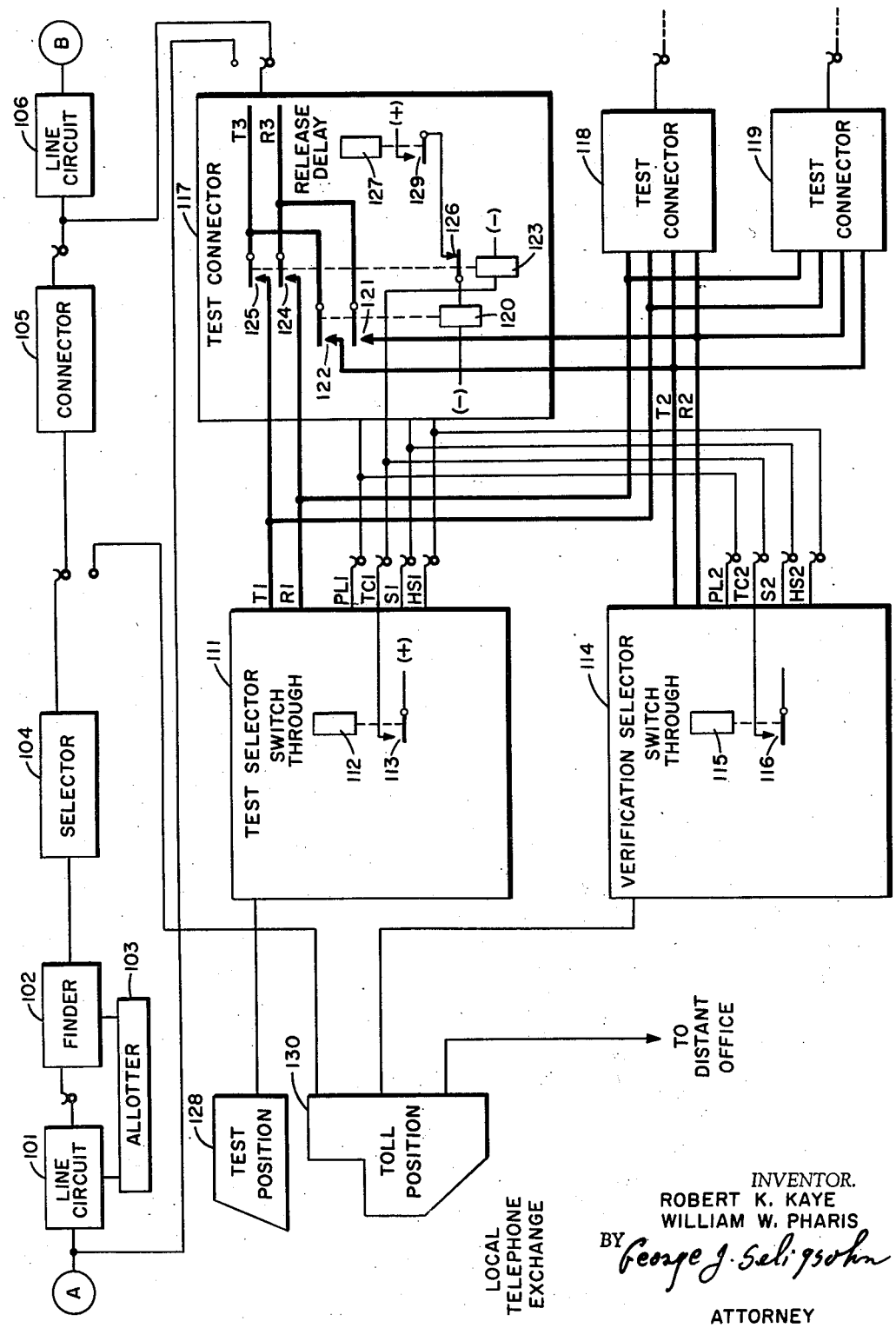
INVENTOR.
ROBERT K. KAYE
WILLIAM W. PHARIS
BY George J. Seligsohn
ATTORNEY

United States Patent Office

2,897,298
Patented July 28, 1959

2,897,298

TEST CONNECTOR CIRCUIT

Robert K. Kaye and William W. Pharis, Rochester, N.Y., assignors to General Dynamics Corporation, Rochester, N.Y., a corporation of Delaware Application June 5, 1957, Serial No. 663,844

5 Claims. (Cl. 179—175.2)

This invention relates to test connectors employed in a telephone system and, more particularly, to a group of such test connectors selectively accessible from either of two respective selectors.

As is well known in the art, it is usual to provide a test position having access to each line of a telephone exchange. This test position is used for both routine tests and fault clearing. Furthermore, it is necessary to provide means by which an operator at a toll position may verify the line of a calling subscriber. In both these cases, it is necessary to utilize special test connectors in extending a connection to a particular line. These special test connectors differ from a normal connector, utilized in extending a connection between two subscribers, in that the former are capable of seizing a line regardless of whether the line is busy or idle, while the latter are capable of seizing a line only if it is idle.

In a small exchange, in which there is relatively little toll traffic, it is economical to employ only two positions, one of which may be a toll position and the other of which may be either a test position, a second toll position, or a position which may be used both as a test position and a second toll position. In any case, where there are only two positions, it is desirable to employ a single first selector which is accessible from solely the first of the two positions and a single second selector which is accessible solely from the second of the two positions. Each of the two selectors is capable of seizing any one of a group of test connectors in response to directive signals applied thereto from the position to which it is connected. Each test connector, in turn, has access to a separate group of subscriber lines, each group of lines usually containing 100 lines.

In order to simplify and reduce the expense of the selectors and the test connectors, the present invention utilizes the technique of multipling the talking conductors from each separate selector to the entire group of test connectors. The technique of multipling the talking conductors is not new, but is shown, by way of example, in Patent 2,564,013, entitled "Telephone Test Selector," by Frank Kessler, granted August 14, 1951, and assigned to the same assignee as the present invention.

It is an object of the present invention to provide a very simple marking scheme for indicating from which respective one of the two selectors a call extended to a test connector comes.

It is a further object of the present invention to provide means for isolating the talking conductors of a test connector seized by either respective one of the two selectors from the multipled talking conductors extending from the other respective one of the two selectors.

It is a still further object of the present invention to provide means for permitting a connection to be extended from either one of the two selectors to a respective one of the group of test connectors over the multipled talking conductors therebetween while another connection exists between the other one of the two selectors and a different one of the group of test connectors over the multipled talking conductors therebetween.

These and other objects and attendant advantages of the present invention will be better understood from the following detailed description of a preferred embodiment thereof taken together with the accompanying drawing, in which:

The sole figure is a block diagram of a telephone exchange utilizing the principles of this invention.

Referring now to the figure, there is shown in diagrammatic form a small local telephone exchange, which has a maximum capacity of 10,000 lines, but preferably fewer lines, associated therewith.

A subscriber of the local telephone exchange, such as "A," may directly dial another subscriber of the local telephone exchange, such as "B," to automatically extend a connection therebetween by means of elements 101–106, inclusive. Since elements 101–106 are conventional and well known in the art, and do not form the subject matter of the present invention, no further description thereof will be given herein.

If subscriber "A" wants to call a subscriber of some distant office, it is necessary for him to dial one or more predetermined digits to cause a connection to be extended by means of selector 104 to an operator at toll position 130. Toll position 130 may be located at the local telephone exchange, as shown, or, if the local telephone exchange is unattended and is a satellite of a central office, toll position 130 may be located at the central office, in which case the connection would be extended over a toll trunk, not shown. In any case, the operator at toll position 130 may then further extend the connection to a distant office in a manner well known in the art.

Included in toll position 130 is directive signal generating means, such as a dial or key set, which has access to verification selector 114 over a direct connection therebetween, if toll position 130 is located at the local telephone exchange, or over a verification trunk, not shown, if toll position 130 is located at a central office.

In a similar manner, test position 128, which may be located as shown at the local telephone exchange or at the central office, includes directive signal generating means which have access to test selector 111 over a connection which extends either directly thereto, if test position 128 is located at the local telephone exchange, or extends over a test trunk, not shown, if test position 128 is located at the central office.

Test selector 111 and verification selector 114 are of identical construction, except that normally open contacts 113 of switchthrough relay 112 of test selector 111 are marked with ground, as shown, while normally open contacts 116 of switchthrough relay 115 of verification selector 114 are marked with absence of ground, as shown.

Outgoing from test selector 111 are four wipers, PL1, TC1, S1 and HS1, associated with switching means, not shown, which are selectively connectible to control conductors of each of a group of identical test connectors, such as test connectors 117, 118 and 119, in response to directive signals applied to test selector 111 from test position 128. Also outgoing from test selector 111 are talking conductors T1 and R1 which are multipled to each of the group of test connectors, such as test connectors 117, 118 and 119, as shown.

In a similar manner, outgoing from verification selector 114 are four wipers, PL2, TC2, S2 and HS2, associated with switching means, not shown, which are selectively connectible to control conductors of each of the group of test connectors, such as test connectors 117, 118 and 119, in response to directive signals applied to verification selector 114 from toll position 130. Also outgoing from verification selector 114 are talking conductors T2 and R2 which are multipled to each of the group of test connectors, such as test connectors 117, 118 and 119, as shown.

Since the entire group of test connectors are identical in all respects, only test connector 117 has been shown in any detail. As shown, test connector 117 includes a pair of outgoing talking conductors T3 and R3 which are normally disconnected from incoming talking conductors T1 and R1, extending from test selector 111, by normally open contacts 124 and 125 of relay 123, and are normally disconnected from incoming talking conductors T2 and R2, extending from verification selector 114, by normally open contacts 121 and 122 of relay 120.

Assume now that directive signals are applied to test selector 111 from test position 128 to cause wipers PL1, TC1, S1 and HS1 to select test connector 117. If test connector 117 is busy, it will return a ground signal to test selector 111 over wiper S1, which ground signal will cause a busy signal to be returned to test position 128 and also prevent the operation of switchthrough relay 112, all in a manner well known in the art. Assuming, however, that test connector 117 is not busy, so that no ground signal is returned over wiper S1, test connector 117 will be seized by test selector 111 and switchthrough relay 112 thereof will be operated, all in a manner well known in the art.

The operation of switchthrough relay 112 will effect the closure of normally open contacts 113 thereof, thereby effecting the operation of relay 123 of test connector 117 over a connection extending from ground, through operated contacts 113, wiper TC1, the individual control conductor of test connector 117 connected to wiper TC1, the winding of relay 123 to grounded battery. The operation of relay 123 will cause the closure of normally open contacts 124 and 125 thereof and the opening of normally closed contacts 126 thereof. The closure of normally open contacts 125 and 124 of relay 123 effects a connection between incoming talking conductors T1 and R1 of test connector 117 and outgoing talking conductors T3 and R3 of test connector 117. The seizure of test connector 117 also results, after a short delay, in the operation of release delay relay 127 thereof, in a manner well known in the art. The operation of release delay relay 127 effects the closure of normally open contacts 129 thereof, which prepare a path for the operation of relay 120 extending from ground through operated contacts 129, now open contacts 126, the winding of relay 120 to grounded battery. Since contacts 126 of relay 123 are now operated, as described above, the operating path for relay 120 is not completed, so that relay 120 does not operate. Therefore, normally open contacts 122 and 121 of relay 120 remain open, thereby keeping outgoing talking conductors T3 and R3 disconnected from incoming talking conductors T2 and R2 of test connector 117.

Now assume that directive signals are applied to verification selector 114 from toll position 130, rather than to test selector 111 from test position 128, in a manner such as to select test connector 117. Verification selector 114 will operate in a manner identical to that previously described in connection with test selector 111 to seize test connector 117, if it is idle, and operate switchthrough relay 115 thereof. The operation of switchthrough relay 115 will effect the closure of normally open contacts 116 thereof, but, since no marking ground is applied to contacts 116, as it is to the corresponding contacts 113 of test selector 111, no energizing circuit will be completed for relay 123 of test connector 117. Therefore, relay 123 will not operate and outgoing talking conductors T3 and R3 of test connector 117 will remain disconnected from incoming talking conductors T1 and R1 extending from test selector 111. Furthermore, normally closed contacts 126 of relay 123 will remain closed. Therefore, when release delay relay 127 operates, in the manner previously described, effecting the closure of normally open contacts 129 thereof, a path will be completed for operating relay 120 over a connection extending from ground through operated contacts 129, normally closed contacts 126, and the winding of relay 120 to grounded battery. Therefore, relay 120 will be operated, effecting the closure of normally open contacts 122 and 121 thereof. The closure of normally open contacts 122 and 121 of relay 120 will effect a connection between outgoing talking conductors T3 and R3 of test connector 117 and incoming talking conductors T2 and R2 from verification selector 114.

Thus, it will be seen that by the simple marking means just described it is possible to provide access to a group of test connectors from each of two selectors over multipled talking conductors, and yet maintain isolation between the talking conductors extending from one selector and the talking conductors extending from the other selector, although each of the selectors may be connected to different ones of the test connectors at the same time.

Although only a preferred embodiment of this invention has been described in detail, it is not intended that the invention be limited thereto, but that the inventon cover all modfications and variations which fall within the scope of any of the appended claims.

What is claimed is:

1. A telephone system comprising a plurality of groups of lines, a plurality of test connectors, each one of said connectors having access to a separate one of said groups of lines, each of said connectors including first and second respective pairs of incoming talking conductors and a pair of outgoing talking conductors normally disconnected from each of said first and second pairs of incoming talking conductors, each of said connectors further including first signal-operated means responsive to a first signal applied thereto for connecting said pair of outgoing talking conductors thereof solely to said first pair of incoming talking conductors and second signal-operated means responsive to a second signal applied thereto for connecting said pair of outgoing talking conductors thereof solely to said second pair of incoming talking conductors, a first selector including a pair of talking conductors multipled to the first pair of incoming talking conductors of each of said plurality of connectors and first switching means coupled to each of said connectors and responsive to directive signals applied thereto for selectively seizing any one of said connectors and applying said first signal solely to said first signal-operated means of said seized one of said connectors only in response to the seizure thereof by said first selector, a second selector including a pair of talking conductors multipled to the second pair of incoming talking conductors of each of said plurality of connectors and second switching means coupled to said connectors and responsive to directive signals applied thereto for selectively seizing any one of said connectors, and means in each of said connectors for applying said second signal to said second signal-operated means in response to the seizure thereof and the failure of said first signal-operated means to operate.

2. The telephone system defined in claim 1, further comprising a first position including directive signal generating means, means for connecting said first position solely to said first selector, a second position including directive signal generating means, and means for connecting said second position solely to said second selector.

3. The telephone system defined in claim 2, wherein each of said first and second signal-operated means comprise relay means.

4. The telephone system defined in claim 3, wherein said relay means of said first signal-operated means comprises a first relay having a winding, normally open contacts connecting said first pair of incoming talking conductors to said pair of outgoing talking conductors and a pair of normally closed contacts, wherein said relay means of said second signal-operated means comprises a second relay having a winding and normally open contacts connecting said second pair of incoming talking conductors to said pair of outgoing conductors, wherein said first switching means includes means for applying said first signal to the winding of said first relay to effect the operation thereof to close said normally open contacts thereof and to open said pair of normally closed contacts thereof, and wherein said means for applying said second signal includes means responsive to the seizure of a connector for applying said second signal to the winding of the second relay through said pair of normally closed contacts of said first relay to effect the operation of said second relay to close said normally open contacts thereof.

5. The telephone system defined in claim 4, wherein said first position is a test position and said second position is a toll position.

References Cited in the file of this patent

UNITED STATES PATENTS 2,806,093     Pharis _____ Sept. 10, 1957